J. E. MAYNADIER.
BILLIARD-TABLE CUSHIONS.
No. 187,654. Patented Feb. 20, 1877.
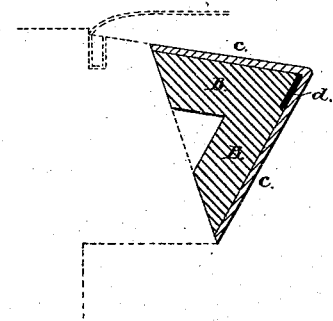
Witnesses:
Geo. H. Graham
Jacob Felbel
Inventor:
James E. Maynadier
by J. N. McIntire
Attorney

UNITED STATES PATENT OFFICE.

JAMES E. MAYNADIER, OF BOSTON, MASSACHUSETTS, ASSIGNOR TO HUGH W. COLLENDER, OF NEW YORK, N. Y.

IMPROVEMENT IN BILLIARD-TABLE CUSHIONS.

Specification forming part of Letters Patent No. 187,654, dated February 20, 1877; application filed January 11, 1877.

*To all whom it may concern:*

Be it known that I, JAMES E. MAYNADIER, of the city of Boston, in the county of Suffolk and in the State of Massachusetts, have invented an Improved Cushion for Billiard-Tables, of which the following is a full, clear, concise, and exact description, reference being had to the accompanying drawing, making a part hereof.

It has been customary previous to my invention in billiard-table cushions composed of rubber and some sort of face-hardening strip or device, to have the face-hardening strip (generally composed of metal) so combined with the rubber that the former should be covered over by the rubber where the balls strike, for the purposes of preventing too much noise by the contact of the balls with the cushion, and to enable the cue-balls to take hold of or gripe the face of the cushion sufficiently in making "twist" shots; but in all cushions of the kind referred to heretofore made the face-hardening strip has been combined with the rubber body or portion of the cushion by either molding it in the rubber or coring out a cavity in the rubber for the subsequent reception of the strip, or by cutting a slit in the molded rubber strip and inserting the face-hardening device therein.

My invention consists in a cushion composed of a rubber body, or main portion having a depression in its face to accommodate or hold the face-hardening strip, a face-hardening strip, and a sheet of rubber to cover over the face-hardening strip, the whole arranged and operating together substantially as will be hereinafter fully described.

To enable those skilled in the art to make and use my improved cushion, I will proceed to describe its construction and operation more fully, referring, by letters, to the accompanying drawings, in which I have shown in cross-section a cushion involving my invention.

B B is the main portion or rubber body of the cushion, which is molded with a depression or recess along its upper front corner, as seen, for the reception or accommodation of and in which the usual face-hardening metallic strip $d$ is placed. C is a sheet of thin rubber equal in length to the length of the cushion, and of about sufficient width to cover the front and upper sides of the body portion B B.

As clearly illustrated in the drawing, the strip $d$ is placed in the depression or recess molded in the rubber body B B, and the thin sheet of rubber C is then placed over the strip $d$, and over the top and front sides of B, so as to hold the metal strip $d$ in place, and is there secured in some suitable manner.

Of course, the size, shape, and material of the face-hardening device may be varied at pleasure without departing from my invention, and the sheet of thin rubber which is applied to cover over the outer surface of and hold in place this face-hardening strip may be made of any desirable thickness; and in lieu of covering the whole of each of the sides of B, as shown, it may be made only wide enough to cover a small portion of each, its main function being to hold in place and cover over the front side of the steel strip $d$.

Without limiting my claim of invention to any peculiarities of size and shape to the parts, beyond those necessary to effect substantially the combination shown,

What I claim as new, and desire to secure by Letters Patent, is—

A billiard-cushion composed of a rubber body molded with a depression or recess in its face, a face-hardening device resting in said depression, and a covering and retaining sheet or strip of rubber, the whole combined to operate substantially as described.

JAMES E. MAYNADIER. [L. S.]

Witnesses:
 GEO. O. G. COALE,
 J. BROWN LORD.